(12) United States Patent
Gurin (10) Patent No.: US 12,395,123 B2
(45) Date of Patent: Aug. 19, 2025

(54) SOLAR PANEL ENVIRONMENTAL ISOLATION SYSTEM

(71) Applicant: Michael Gurin, Glenview, IL (US)

(72) Inventor: Michael Gurin, Glenview, IL (US)

(73) Assignee: Michael Gurin, Glenview, IL (US)

( * ) Notice: Subject to any disclaimer, the term of this patent is extended or adjusted under 35 U.S.C. 154(b) by 16 days.

(21) Appl. No.: 18/402,713

(22) Filed: Jan. 2, 2024

(65) Prior Publication Data

US 2025/0141401 A1     May 1, 2025

Related U.S. Application Data

(60) Provisional application No. 63/594,012, filed on Oct. 29, 2023.

(51) Int. Cl.
    *H02S 40/42*     (2014.01)
    *H02S 40/36*     (2014.01)

(52) U.S. Cl.
    CPC .............. *H02S 40/42* (2014.12); *H02S 40/36* (2014.12)

(58) Field of Classification Search
    CPC .................................. H02S 40/42; H02S 40/36
    See application file for complete search history.

(56) References Cited

U.S. PATENT DOCUMENTS

2010/0314509 A1*   12/2010   Conger ................... H02S 20/10
                                                    248/121

* cited by examiner

*Primary Examiner* — Tae-Sik Kang (57) ABSTRACT

The present invention relates to a solar energy harvesting system preferably mounted in a relatively flat position and isolated from its external operating weather environment to maximize automated installation, minimize embodied carbon dioxide footprint, and minimize deployment and environmental uncertainties driving up total installed system cost. The environmental weather isolation further empowers solar design features by minimizing and isolating structural design load requirements away from the objects receiving the solar energy through a multifunctional film that isolates the objects receiving solar energy from the weather.

13 Claims, 9 Drawing Sheets

Side View

Fig. 4

Top View

Fig. 5

Electrical View

Fig. 6

Thermal View

Side View - Normal

Side View - Snow

Side View - Wind

SOLAR PANEL ENVIRONMENTAL ISOLATION SYSTEM

CROSS-REFERENCES

This patent application claims priority to and is also a Continuation-In-Part of U.S. Patent Provisional Application No. 63/594,012 titled "Bi-Directional Lane Constrained Logistics System" on Oct. 29, 2023, the contents of which are incorporated by reference.

BACKGROUND OF INVENTION

Prior art includes virtually the entire field of solar power including photovoltaic and thermal harvesting. The historically high cost of solar panels has led to design implementation decisions that maximize the harvesting of solar energy per panel surface area (e.g., kilowatt energy per square meter). The dramatic reduction in solar panel cost has outpaced the reduction in balance of plant costs associated with solar energy harvesting yet solar system design and implementation continues under the basis that solar energy power per panel surface area is critical to a successful system deployment.

A need exists, therefore, for a solar system to optimize balance of plant components as a priority beyond the solar energy harvested per panel surface area.

Yet another need exists for solar panels to be isolated from its operating envelope to reduce balance of plant and installation costs.

Another need exists for panel isolation from its operating envelope to reduce the system structural weight, and solar panel direct and installation costs.

A further need exists for superior solar panel thermal management to overcome the decreased thermal dissipation resulting from isolation from its operating envelope, while concurrently increasing the repurposing of harvesting solar energy for on-site thermally driven processes.

Yet another need exists to utilize enhanced thermal isolation of solar panels for superior removal of snow or ice leveraging thermal differential of operating envelope below and above the isolation film creating the barrier to the operating envelope.

A need also exists to reduce the physical weight of system components (at least the above ground portion), balance of plant component costs, and installed system capital and installation costs.

Another need exists for panel reconfiguration into a reduced aerodynamic force mode predominantly by utilizing gravity to reposition from a first normal operating position to a second low-wind profile position to reduce the system structural weight due to maximum wind loading design requirements.

Yet another need exists to utilize the same operating envelope isolation film for the entire surface area below the isolation film while concurrently enabling freedom of movement along the entire length of the system above the ground.

Another need exists to install the solar panels in an automated manner from the ground while also configured in the minimum snow or ice accumulation position.

And finally, another need exists to reduce the embodied carbon footprint of solar systems.

FIELD OF INVENTION

The present invention generally relates especially to the field of solar energy systems optimized for environmental isolation. The further inclusion of solar panel design features empowered uniquely by environmental isolation.

BRIEF SUMMARY OF INVENTION

The present invention relates to a solar panel isolated from operating envelope and design features empowered by that environmental isolation to maximize installation automation and minimize implementation as well as operational uncertainties.

This summary is provided merely to introduce certain concepts and not to identify any key or essential features of the claimed subject matter.

DEFINITIONS

The term "solar facing" is the orientation of a solar panel relative to the sun in which the solar harvesting front (active sun harvesting) of the solar panel is facing the sun, meaning the top of the solar panel is closer to the sun than the back of the solar panel.

The term "non-solar facing" is the orientation of a solar panel relative to the sun in which the solar harvesting back of the solar panel is facing the sun, meaning the back of the solar panel is closer to the sun than the front of the solar panel.

The term "multi-functional" is an operational feature in which at least two distinct functions are achieved simultaneously notably when the distinct functions are not related or typically concurrent features.

The term "thermal spreader" is the directional movement of thermal energy (i.e., phonons) in which thermal conductivity enables in-plane heat transfer.

The term "high wind" is a wind speed that is projected to be more than the top 50 percent of the system design conditions, more notably a wind speed that is projected to take occurs less than 10% of the total time system is deployed.

The term "high snow or ice" is a snow or ice accumulation that is projected to be more than the top 50 percent of the system design conditions, more notably a snow or ice accumulation that is projected to occurs less than 10% of the total time system is deployed.

The term "cable structure" is the utilization of a flexible structural element in which structural support is provided predominantly (greater than 90% of structural support) when the structural element is in tension as compared to compression (less than 10% of structural support). Dead loads are predominantly transmitted through the cable structure laterally as tributary loads as structurally then connected at a different horizontal location to a structural element in structural communications to the ground.

The term "tributary-load" is the accumulation of structural loads that are directed toward a particular structural member.

The term "dead-load" is the accumulation of structural loads that are directed toward the ground resulting from the weight of the aggregate structural members.

The term "live-load" refers to the dynamic structural forces from variable tributary-loads resulting from variations of internal and external forces on the system structural elements due to secondary functions intended use. They represent the transient forces that can be moved through the sun empowered production system or act on any structural element.

The term "environmental load" refers to the structural forces resulting externalities including from snow, wind, soil movement and seismic activity.

The term "structural aggregate-load", also referred to as "aggregate-load", refers to the summation of structural forces arising from tributary-load, dead-load, live-load, and environmental-load where it is understood that design load conditions are particularly focused on the aggregate-load and not simply any subset of tributary-loads, dead-loads, live-loads, and environmental-loads.

The term "structural low-loading condition", also referred to as "low-load condition", is the occurrence of structural aggregate-loads that is at least 40% less than the design specification of a particular structural member.

The term "structural sub-design-loading condition", also referred to as "sub-design load condition", is the occurrence of structural aggregate-loads that is at least 10% less than the design specification of a particular structural member.

DETAILED DESCRIPTION OF THE INVENTION

Here, as well as elsewhere in the specification and claims, individual numerical values and/or individual range limits can be combined to form non-disclosed ranges.

Exemplary embodiments of the present invention are provided, which reference the contained figures. Such embodiments are merely exemplary in nature. Regarding the figures, like reference numerals refer to like parts.

Solar panels configured in their optimal solar energy harvesting position forces substantial adverse solar panel design specifications notably panel structural integrity during design wind, snow, and/or ice load forces (and of course the combination of high winds and high snow or ice accumulation) forcing solar panel thickness to accommodate such forces. Additionally, the solar panel is also designed to handle the force of ice hail. balance of plant components as a priority beyond the solar energy harvested per panel surface area. The inventive system isolates these forces away from the solar panel, as well as enabling the system to reconfigure into an environmental minimal force position that is uniquely identical to the position in which solar panel installation is automated with further ease. The inventive system achieves the reconfigurable position by utilizing a multifunctional film to isolate the solar panels from the operating environment and by positioning the solar panels in an approximately flat position relative to the ground. The inventive system has solar panels that are designed for a structural load that is at least 50% lower leading to an at least 50% lower panel weight (and preferably a structural load that is at least 75% lower leading to an at least 75% lower panel weight. The inventive system utilizing the multifunctional film, that compares favorably with both glass and polymers traditionally utilized in standard rigid solar panels, has an elongation at break that is at least 3 times greater than solar glass (and preferably at least 10 times greater), and a tensile strength that is at least 3 times greater than solar glass all of which enable the multifunctional film to stretch over the operational lifetime of the system and to not break while being exposed to wind, snow, and/or ice load forces.

The particularly preferred multi-functional film has a non-flat (preferably less than 5000 microns, particularly preferred less than 2000 microns, and specifically preferred less than 500-micron scale) profile on the non-solar facing side of the film, the non-flat profile is predominantly on a horizontal plane relative to the ground (e.g., parallel to the ground is particularly preferred though always less than a 35-degrees angle from the ground). The specifically preferred multi-functional film has the non-flat profile that has at least a first profile to optically redirect the solar angle downward by a minimum angle of 10-degrees (and preferably at an angle of up to 45-degrees, inclusive of 15 degrees, 20 degrees, 30 degrees, and 35 degrees) to compensate for the otherwise approximately flat positioned solar panels. A more preferred multi-functional film has two distinct non-flat profiles with the first non-flat profile redirecting the solar angle downward towards solar panels facing the sun and the second non-flat profile redirecting the solar angle upwards towards an approximately vertical reflective surface that subsequently reflects the sun towards solar panels non-facing the sun. The bottom solar panel facing non-flat profile optically redirects a solar vector (the direction of the sun towards the inventive system) having an entry film angle passing through the multifunctional film and having an exit film angle after passing through multifunctional film that is at least ten degrees different (and inclusive of 15 degrees, 20 degrees, 30 degrees, 35 degrees, and preferably at least 45 degrees) between the entry film angle and the exit film angle. The combination of solar facing and non-solar facing solar panels reduces the structural weight of the system and reduces the environmental facing surface area when the solar panels are reconfigured into their stowable mode. As known in the art, the preferred multi-functional film has a water roll-off angle of less than 15-degrees (and preferably of less than 10 degrees, particularly preferred at less than 5 degrees and more specifically preferred at less than 3 degrees); and an ice adhesion strength less than 150 kPa (and more preferred an effective ice adhesion strength taking into account the entire surface area of less than 100 kPa, and particularly preferred less than 5 kPa). The even more preferred multi-functional film is elongated after snow and/or ice accretion periods to overcome by at least 2 kPa the ice adhesion strength reducing snow and/or ice accretion by at least 25% more than the non-stretched multi-functional film (and preferred by at least 60%, particularly preferred by at least 80%, and specifically preferred by at least 95%). The multifunctional film has the metallized reflective portion to redirect solar energy towards non-solar facing solar panels (or to increase effective solar intensity towards solar facing solar panels) that in the preferred embodiment is in thermal continuity with at least one heat exchanger further in thermal continuity with the solar panels, therefore an in-plane thermal pathway is created within the multi-functional film "MFF" for enhancing the active removal of accreted snow and/or ice from the MFF especially in the critical area in which ice-bridging can occur (i.e., on the MFF over the top roller, this both increasing the flatness region and most importantly also reducing the air gap immediately below the MFF due to the top roller).

This inventive solution to minimize snow or ice accretion begins with the design of the MFF. The so-called icephobic MFF preferentially elongates in the approximately vertical direction (top to bottom orientation, at least relative to the approximately horizontal direction which is left to right orientation), maximizes in-plane heat transfer also in the approximately vertical direction (relative to the approximately horizontal direction), maximizes heat transfer into the in-plane heat transfer by direct thermal communications with the portion of the MFF having the highest through-plane thermal conductivity (e.g., metallized film, or maximized high thermal conductivity fillers including carbon nanotubes; all which can occur in the portion of the MFF not requiring optical transparency), maximizes heat transfer at a position closest to the MFF having the highest snow or ice accretion, maximizes air gap below the MFF including by having a predominantly horizontal non-flat profile on the solar non-facing side of the MFF, minimizes solar non-facing side structural support on the solar non-facing side of the MFF, utilizes a predominantly vertical oriented cable support as the solar non-facing side structural support, and has at least one roller approximately parallel to the horizon (and preferably on the bottom length of the deployed MFF) to both maintain a specified tension on the MFF during normal operations and to increase the specified tension on the MFF by achieving an at least amount of elongation greater than 0.01 percent of the MFF width (and preferably at least greater than 0.1 percent, and more preferred at least greater than 1.0 percent) along the width of the MFF to initiate delamination of the accreted snow or ice further enabled by the force of gravity. The particularly preferred MFF has a "LIT" (as known in the art of icephobic coatings) top coating (i.e., solar facing) that also has a low water roll-off angle with any further lamination layers being softer than the top coating (and preferably an air gap between the bottom layer of the MFF to the structural support), with the structural support having minimal physical contact area with the MFF and preferably being heated by thermal energy captured underneath the MFF and particularly preferred such that a soft foam layer is in between the structural support and the MFF. The real-time tension on the roller doubles as a sensor for determining the mass of accreted snow or ice on the MFF, which then triggers an at least nominal increase in tension to elongate the MFF. The ideal embodiment utilizes the roller to periodically increase and then decrease the tension during actual snow or ice accumulation periods, as well as maximizes in-plane heat transfer during those same accumulation periods. The further inventive utilization of the icephobic MFF is the dynamic alteration of the MFF shape, creating localized forces to dislodge otherwise accreted snow or ice, and in the best embodiment to reduce the actual and effective horizontal surface area while retaining the remaining weather exposed surface area to be predominantly vertical surface area (the preferred horizontal to vertical surface area ratio is greater than 1:2, more preferred ratio is greater than 1:4, and specifically preferred ratio is greater than 1:5). It is understood that the term "effective horizontal surface area" is the surface area as viewed from the top perspective (i.e., perpendicular to the ground) and the term "effective vertical surface area" is the surface area as viewed from the side perspective (i.e., parallel to the ground), and that each position has such a vertical and horizontal surface area.

Figure 1:
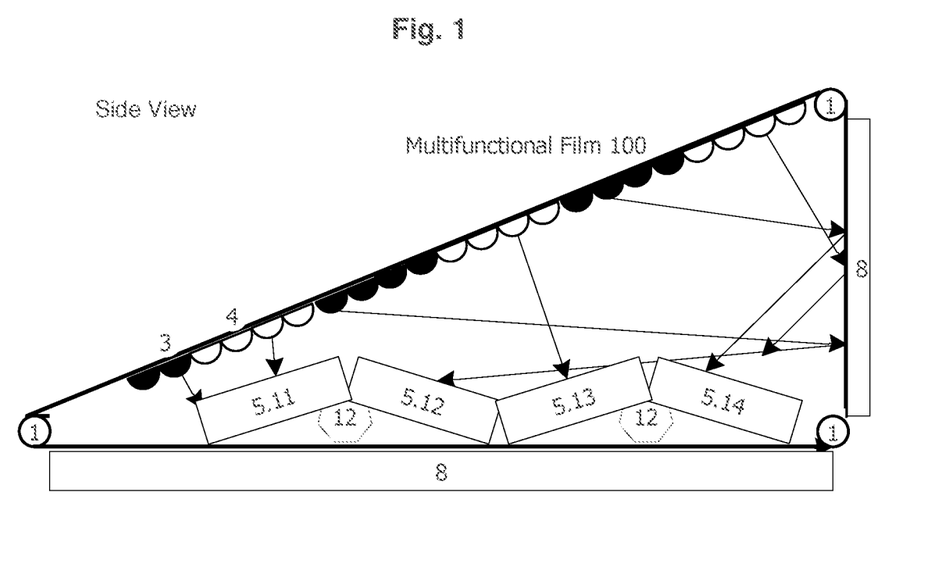
FIG. 1—is a side view of the multifunctional film providing environmental isolation and optical redirection for the solar system having solar panels in which a subset of the total panels is solar facing and the remaining panels are non-solar facing yet all being intentionally mounted relatively flat in comparison to a traditional installed angle maximizing solar harvest.

Turning to FIG. 1, FIG. 1 depicts a side view (along the width side, as opposed to the long side of the solar panel array) beginning at the lower right side of the MFF 100 having a backside reflective surface 8 which optically redirects solar energy (i.e., rays of light) towards the solar panels (notably the solar non-facing panels) 5.12 and 5.14. The MFF continues upward around a first (upper right) cylindrical roller 1 (which preferably rolls such that the MFF experiences nominal friction when being repositioned or stretched, though it is understood that it can simply be a cylindrical cable support or rod to predominantly provide tension support), then downward at an angle depicting a first non-flat profile 4 (on the interior, solar non-facing side of the MFF) having an optical redirection downward and a second non-flat profile 3 having an optical redirection upward with the angle being in reference to a normal solar vector through a transparent (or at worst translucent) polymer film (or flexible glass) where the optical film has no profile. Each shown instance of another cylindrical roll 1 has the same functionality of not interfering with the movement of MFF during its repositioning or reconfiguration. As shown a second region of reflective surface 8 is on the bottom portion of the inventive structure, this being optional and having the benefits of superior thermal management within the operating envelope internal to the MFF zone as well as known in the art reflective surfaces for bi-facial solar panels. Representative solar vectors are shown, which are approximate in terms of the actual angles, which are precisely engineered to optimize downward redirection to solar facing panels 5.11 and 5.13 and upward redirection to solar non-facing panels 5.12 and 5.14. A multifunctional heat exchanger 12 at the upper convergence point of solar panels 5.11 and 5.12, and 5.13 and 5.14 provides a thermal conduction path for solar panel heat created due largely to infrared energy and inefficiencies of solar to electricity conversion, in addition to maintaining the desired angle relative to the horizon angle. The combination of solar facing and solar non-facing panels leads the MFF to have both upward and downward non-flat profiles that are sequential (with the understanding that it repeats as corresponding to the respective facing or non-facing panels).

The utilization of the MFF virtually eliminates the susceptibility of the solar panels from wind, snow, and/or ice dead loads enabling the solar panel to reduce. Furthermore, the reduction of the solar panel weight has a cascading benefit of reduced dead load on the supporting structure for the solar panels. This results in a very important inventive feature of enabling a cable structure to provide support for the solar panels, as the cable structure solely needs to meet the requirements of the solar panel dead load and no longer the otherwise substantially greater tributary and dead loads due to wind, snow and/or ice forces. Cable structures provide a further reduction in system weight, and importantly enables very compact shipment of the solar structure for deployment as well as roll-to-roll installation. The substantial force and then weight decrease of the cable structure versus the typical steel support structure enables the composition of the cable structure to be aluminum, copper, carbon fiber, or preferred aluminum with carbon nanotube composite having best-in-class electrical and thermal conductivity (at least 50% superior to steel structure). This leads to another inventive feature where the cable structure becomes both structural support for the solar panels and electrical power bus for the power generation resulting from the solar energy conversion via solar panels (i.e., photovoltaic panels). The cable structure being both structural support and electrical power bus reduces the necessary installation steps by 50 percent. And furthermore, the structural support being in structural communications with the solar panels enables the proximity to have electrical continuity between the cable structure and the solar panels. This combined with the solar panels being protected from the operating envelope (i.e, weather and water specifically, as well as animals) enables a "simple" wire to provide the electrical continuity between the solar panel and the cable structure, which readily (as known in the art) enables ultrasonic welding (or any known in the art method for electrical continuity) with the subsequent optional liquid dispersion of polymer sealant on top of the weld therefore eliminating the traditional solar cable connector multi-branch connector and its associated costs on both the solar panel and electrical power cable ends. In addition, the isolation of the solar panel from the operating environment eliminates the need for the solar panel frame (i.e., frameless) and junction box both leading to further weight reduction, cost reduction, and importantly reduced thickness. The reduced thickness then further cascades into reduced aerodynamic forces due to wind loads leading to a reduction of tributary and dead loads both during normal configuration as well as stowed configuration. It is understood that normal configuration optimizes, at least relative to any other configuration (i.e., alternative configuration for an alternative mode), solar harvesting. The substantially flat solar panels greatly increase the ease of automated installation in addition to at least 30% more stacking density for automated vehicle carrying the solar panels prior to installation on the solar system structure. In fact, the ideal solar panel now utilizes edge electrical connectors making the solar panel completely flat to achieve a particularly preferred stacking density of at least 70% and specifically preferred of at least 80% as compared to traditional solar panels with junction box on the backside. The utilization of electrical edge connections eliminates the requirement for backside electrical cable access, an especially important feature to reduce installation costs and to ease the automated installation process. Yet another preferred embodiment is that the backside of the solar panels provides superior thermal management (i.e., superior thermal spreading and elimination of hot spots) due to metal conductivity and such that the metal conductivity enhances the heat transfer from the solar panel to the support structure via the cable support structure, which is further in thermal communications to heat exchangers for both reducing solar photovoltaic operating temperature as well as increased solar thermal harvesting. This enhanced thermal conductivity is critical as the solar panels no longer benefit from convection attributed to wind speed of the operating envelope (i.e., weather). The disadvantage though of the absence of convection does lead to superior conduction pathways for solar thermal harvesting through only the more desirable thermal conductivity pathways (i.e., conduction losses to the traditional glass and backsheet, then to convective wind) provides at least 25% higher solar thermal harvesting, preferably at least 35% higher, and specifically preferred at least 45% higher.

The inventive system leverages preferred half-cell modules in which the solar panel is segmented into at least two parallel connected segments, with the preferred solar panel orientation being landscape and the segmentation being further such the parallel segmentation is also in predominantly horizontally oriented segments. The particularly preferred solar panel is landscape orientation, half-cells also in landscape orientation, half-cells connected in series with half-cells along the same horizontal plane, and horizontal segments then connected in parallel for the solar panel output. The solar panel array has solar facing panels connected in a first string that is distinct from the solar non-facing panels connected in a second string, which is ideal as the cable structure is best also in a horizontal layout (that happens to correspond to the length of the solar panel array). The particularly preferred solar panels have a length to width ratio of at least 2:1, preferably at least 4:1, and specifically preferred at least 8:1 such that the long dimension is mounted within the system in a landscape orientation. It is understood that full cells can be utilized instead of half- or quarter-cells particularly for the solar panels having a length to width ratio at least greater or equal than 4:1. Similar to bi-facial cells in terms of performance, the inventive utilization of reflective surface above the solar panels increases the solar intensity but above the solar panels as compared to below the solar panels for bi-facial cells. The substantially lower weight of the solar panels enables long, relatively thin, deployment to be achieved without risk of solar panel breakage when utilizing even rigid silicon-based photovoltaic "PV" materials. The elimination of the resulting solar panels requirement to handle external forces (at design conditions) created by the operating envelope (i.e., weather) is fundamental to enabling silicon-based PV cells with a length greater than 2 meters (and preferably greater than 3 meters, and specifically preferred greater than 4 meters).

As a result of the reduction of solar panel weight, and even more importantly the structure weight required to ensure long-term operations of the solar panel, the aggregate reduction of weight enables the actuation power required to move the solar system from the normal operating position to the stowed (which is also the installation position) position to be less than the gravity force requirements, therefore being fail safe, inexpensive, and responsive to external fast-changing weather conditions (though it is rare in terms of likelihood over the long-term deployment). The inventive embodiment preferably eliminates (though smaller actuators or motors can still be used as anticipated) any motors required to change from the normal operating position to the stowed position, however it is recognized that an external motor is required to return the solar panels and MFF from the stowed position to the normal operating position. It is a fundamental principle that post-installation this requirement is very rare and the exception (and in many instances absent of design wind loads, and the MFF's implementation to reduce or eliminate snow and/or ice accretion ideally are seasonally eliminated) rather than the rule, and therefore using a deployable motor or actuator following the rare event of solar system being moved to stowed position is a very economical method in terms of further reducing upfront capital costs.

The reconfiguration ability of the solar system between a normal and stowed position is a fundamental feature such that the stowed position is utilized for rapid installation (and preferred rapid automated processes). The lightweight structure, especially for cable structure, enables the creation of an ultra-lightweight super-structure that is post-tensioned into the framework in which the cable structure that supports the solar panels is then subsequently installed with another post-tension step prior to the installation of the solar panels. The utilization of the cable structure increases the width between ground support columns to greater than 4 meters (and preferably greater than 6 meters, and particularly preferred greater than 15 meters). The preferred ground support columns are also cable structure components that are subsequently post-tensioned. In this manner, the entire solar system "floats" above the ground with minimal impact of non-flat ground below the solar system therefore in most instances eliminating the requirement to level the ground, and equally as important enabling the inventive solar system to be deployed on ground terrain that is not otherwise suitable for solar harvesting. Elimination of ground leveling costs (i.e., avoiding the use of construction grader equipment) is another benefit of the inventive solar system in the aggregate reduction of balance of plant and installation costs.

Once the structural elements in structural communication with the ground are post-tensioned, the installation of the solar panels begins with placement of the solar panels onto the post-tensioned cable structures. As noted elsewhere, the solar panels are preferably ultrasonic welded for electrical continuity and structural continuity to the cable structure. This series of installation processes are done while the cable super-structure is in the stowed position (i.e., not the normal operating position) therefore both reducing the cost and time to install the solar panels and importantly reducing the installation height of the solar panels. The cable structure is multifunctional in this inventive system as it provides both structural function (to enable solar panel to float above ground) and as electrical function (i.e., stringing of solar panels providing interconnection of individual solar panels). As noted before, this enables string of solar panels along the horizontal direction easily and then providing the individual horizontal strings (if desired) into parallel circuits along the vertical direction. As known in the art, it is optimal to have an MPPT for each horizontal string rather than putting horizontal strings into parallel circuits.

It is understood that many of the features relevant to this solar system are relevant and applicable for greenhouse operations, and in fact an ideal implementation is such that solar facing panels remain as is and solar non-facing panels are replaced with agricultural operations especially for low height crops (e.g., carrots, radishes, onions, potatoes, lettuce, etc.)

The environmental isolation of the inventive system traps below the MFF substantial amount of heat that otherwise is dissipated via convection between the solar panels and the external environment. This lack of convection demands heat transfer away from the solar panels using conduction pathways, which due to inventive reasons including the reduced thickness of the solar panel there is less thermal resistance on the active solar PV side, and the further utilization of a backsheet (preferably metalized or particularly including carbon nanotubes, or specifically including vertically aligned carbon nanotubes on a metal substrate for superior thermal spreading) also reduces thermal resistance. The backsheet is the preferred mechanism for direct heat transfer via conduction to an active heat exchanger. It is known in the art that a higher flow rate, all things equal, will enable the solar PV to operate at higher solar to electricity conversion rates though will provide a lower temperature of the heat transfer fluid (which can then be increased further through a heat pump or mechanical vapor recompression). Alternatively, and anticipated, water droplets can be atomized and then through evaporative cooling reduce the solar panel maximum operating temperature due to the enclosed operating environment that the solar panels are exposed to. Yet another alternative is to simply flow water over the solar panels such that both conduction and some evaporative cooling takes place when necessary. It is understood that utilization of active evaporative cooling will only take place when the external weather doesn't create condensation within the actual enclosed solar panel exposure envelope. It is understood that each figure doesn't show each inventive feature of the invention, such as in FIG. 1 the cable structure as well as other structural elements are not shown. Furthermore, the descriptions within each figure are predominantly in-depth descriptions of the features uniquely shown in the respective figure.

Figure 2:
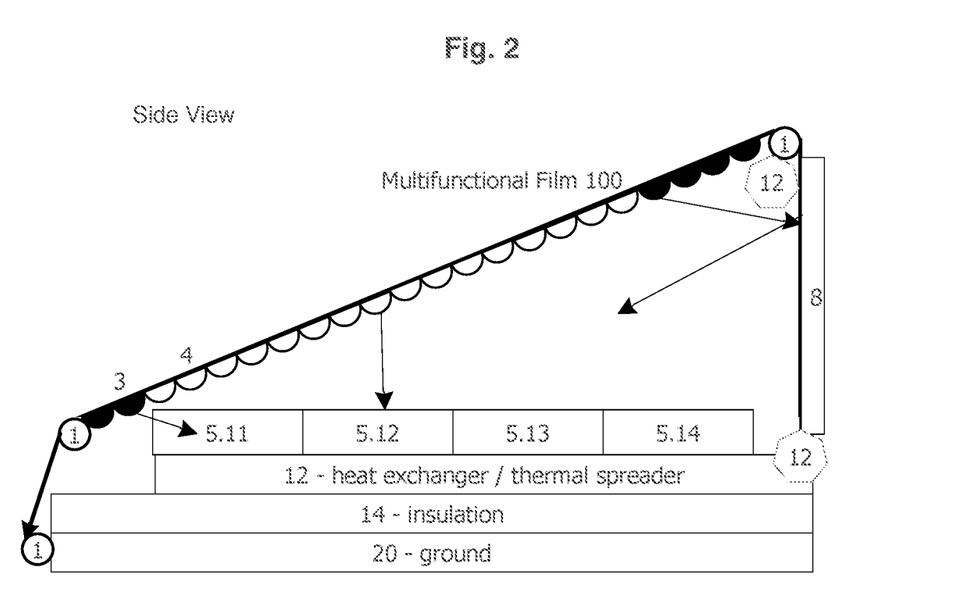
FIG. 2—is a side view of the multifunctional film providing environmental isolation and optical redirection for the solar system having solar panels in which all the solar panels are intentionally mounted relatively flat in comparison to a traditional installed angle maximizing solar harvest.

Turning to FIG. 2, FIG. 2 has the utilization of the heat exchanger 12 at the top portion of the enclosed solar panel operating environment (heat exchanger 12 as shown in FIG. 2 in the upper right-hand corner) in thermal communications with the reflective portion 8 of the MFF. The further heat exchanger 12 (as shown in FIG. 2 just above the ground 20 and insulation 14) is the preferred heat transfer pathway when the solar panels are completely flat in their normal operation position. The result is superior solar panel thermal management to overcome the decreased thermal dissipation resulting from the isolation from its external operating envelope, while concurrently increasing the repurposing of harvesting solar energy for on-site thermally driven processes. Additionally, a lower upward redirecting MFF non-flat portion 3 increases the effective surface area by directing solar energy that would otherwise miss the solar panel(s) 5.11. In this figure, the absence of non-facing solar panels (all are solar facing 5.11 through 5.14) eliminates the sequential corresponding changes of upward 3 downward 4 profiles. Each of the solar panels are in direct thermal continuity with the heat exchanger/thermal spreader 12 (which has insulation layer 14) to contain thermal energy within the MFF internal operating zone, all of which is above the ground 20. It is understood that the distance between the insulation layer 14 and the ground (and in fact the distance between the lowest portion of the MFF and the ground) can be virtually any distance from 0.0 meters to 20 meters, though in virtually all situations less than 5 meters). In this shown instance the MFF 100 does not fully enclose the solar panels as the insulation 14 and ground 20 both serve to isolate the solar panels from the external above MFF environment (i.e., weather).

The combination of the bottom and top heat exchangers (as shown in FIG. 2) self-sufficient thermal source for heat transfer from the larger surface area of the solar panels through the bottom heat exchanger 12 to the top heat exchanger 12, including the known in the art operating mode as a passive heat pipe (or alternatively an active heat pipe or via traditional circulation pump) to melt any accreted snow or ice at the highest (and most critical) point of accumulation (which also corresponds to the part of the MFF with the lowest amount of air gap, meaning the highest effective ice adhesion strength) to initiate ice crack propagation enabling gravity to dislodge the accreted snow or ice and virtually eliminate the optical interference imposed by the accreted snow or ice. In this inventive manner, the accumulated heat from within the sealed actual operating envelope of the solar panels thermal energy is more effectively transferred to the critical point required for snow or ice management at the interface of the MFF. The preferred MFF has at least 0.05 percent carbon nanotubes to increase the tear and puncture resistance by at least 10 percent as compared to the MFF without the carbon nanotubes. The carbon nanotubes serve the additional inventive function within the MFF of maximizing heat transfer in-plane to increase the thermal spreading from the top heat exchanger 12 (as shown in FIG. 2). The net result is the enhanced thermal isolation of the solar panels enables superior removal of snow or ice from the MFF by leveraging thermal differential of the sealed operating envelope below the MFF and above the MFF isolation film creating the barrier to the external system operating envelope (i.e., weather).

It is understood that in the context of reducing weight of the system, it is particularly in reference to reducing the mass impact on tributary loads to a much larger degree than dead loads. In particular, the weight of any ballast or concrete within the direct to ground mounted structures (e.g., vertical poles into the ground) are largely excluded from any references to reduced structural weight. It is known in the art of post-tensioning concrete that concrete vertical pipes are a superior (and inexpensive) method to transfer tributary loads from a cable structure into the ground for anchoring of the entire structure. The concrete can be replaced, as known in the art, with locally sourced earth known for rammed earth structures that also have excellent compression load capacity. Another further advantage of reducing the structural weight of the solar panel and MFF support structures is an at least linear reduction of conduction and convection thermal pathways (i.e., thermal loss that can't then be selectively utilized for melting any accreted snow or ice). In other words, the isolation of the solar panels from the MFF enables any available solar energy transmitted through the MFF and landing on the solar panels to be effectively concentrated to the MFF for in-plane thermal spreading serving as a superior self-sufficient thermal source to melt accreted snow or ice on the MFF. The inventive system reduces convection losses of the solar panel by at least 20 percent (preferably at least 50 percent, and particularly preferred at least 75 percent); diverts thermal energy from the solar panels due to solar energy not converted into electricity as well as ground sourced thermal energy (that is now also isolated from the external environment in which the MFF remains susceptible to) to the MFF by at least 25 percent higher than MFF not in thermal communications with the heat exchanger(s) (and preferably by at least 50 percent higher, and specifically preferred by at least 80 percent); with the now harvested thermal energy preferably transferred through the metalized portion of the MFF that serves as the reflective area to redirect not yet solar energy back to the solar panels (particularly the non-facing solar panels) into the MFF in-plane for superior heat transfer with minimized hot spot susceptibility due to the enhanced thermal conductivity of the metallized portion of the MFF as compared to the non-metallized portion of the MFF (i.e., thermal conductivity of the metallized portion to the non-metallized portion ratio at least 2:1 and preferred at least 10:1 and particularly preferred at least 20:1) providing superior in-plane heat transfer in the MFF by at least 2:1 and preferred at least 10:1 and particularly preferred at least 20:1. The systems superior capability of reducing or eliminating accreted snow or ice further reduces the design specifications attributed to snow or ice accretion and its direct impact on tributary and dead load requirements, which further reduces the structural physical weight leading to yet further reduction of balance of plant component costs, and installed system capital and installation costs.

The systems designed feature of rapid reconfiguration also enables a dramatic reduction of wind load impact onto the structure and the MFF. The system reduces the aerodynamic forces imposed onto the MFF in the normal operating position to the stowed operating position by at least 50 percent (and preferred at least 80 percent and particularly preferred at least 92 percent) by reducing the effective camber thickness of the resulting structural profile leading to a reduction of aerodynamic forces by at least 95 percent. The preferred system utilizes gravity forces to enable the top portion of the MFF to move in either a towards the sun or away from the sun (at least during normal operating solar energy harvesting mode), or alternatively an actuated motor or actuator to move the cable structure that is at the top position (as shown in FIGS. 1, 2, 3, 7, 8, and 9) also serving as supporting the MFF rolling mechanism 1 (and film stiffener) 1 specifically shown in FIG. 7. The net result is the panel reconfiguration reduces the aerodynamic forces predominantly by utilizing gravity to reposition from a first normal operating position to a second low-wind profile position to reduce the system structural weight due to maximum wind loading design requirements. This repositioning also enables the water roll-off angle to be controlled whether it be due naturally to rain or artificially for a washing cycle. It is anticipated that the MFF rolling mechanism enables active washing cycle to take place such that the MFF is rolled to an offsetting cleaning roller (not shown) for easy MFF cleaning with minimal water usage.

Figure 3:
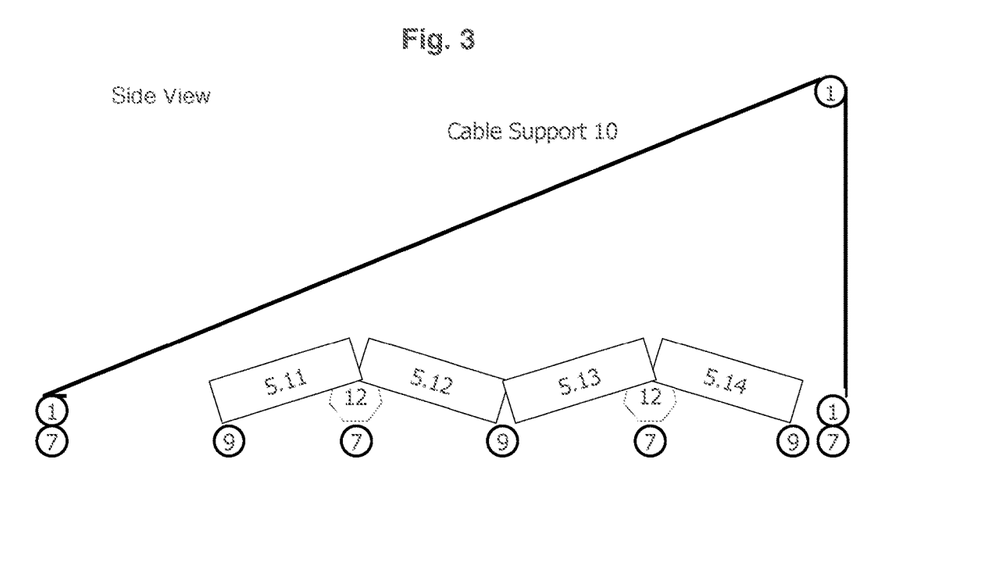
FIG. 3—is a side view of the cable support system for the solar system having solar panels in which a subset of the total panels is solar facing and the remaining panels are non-solar facing yet all being intentionally mounted relatively flat in comparison to a traditional installed angle maximizing solar harvest.
Figure 4:
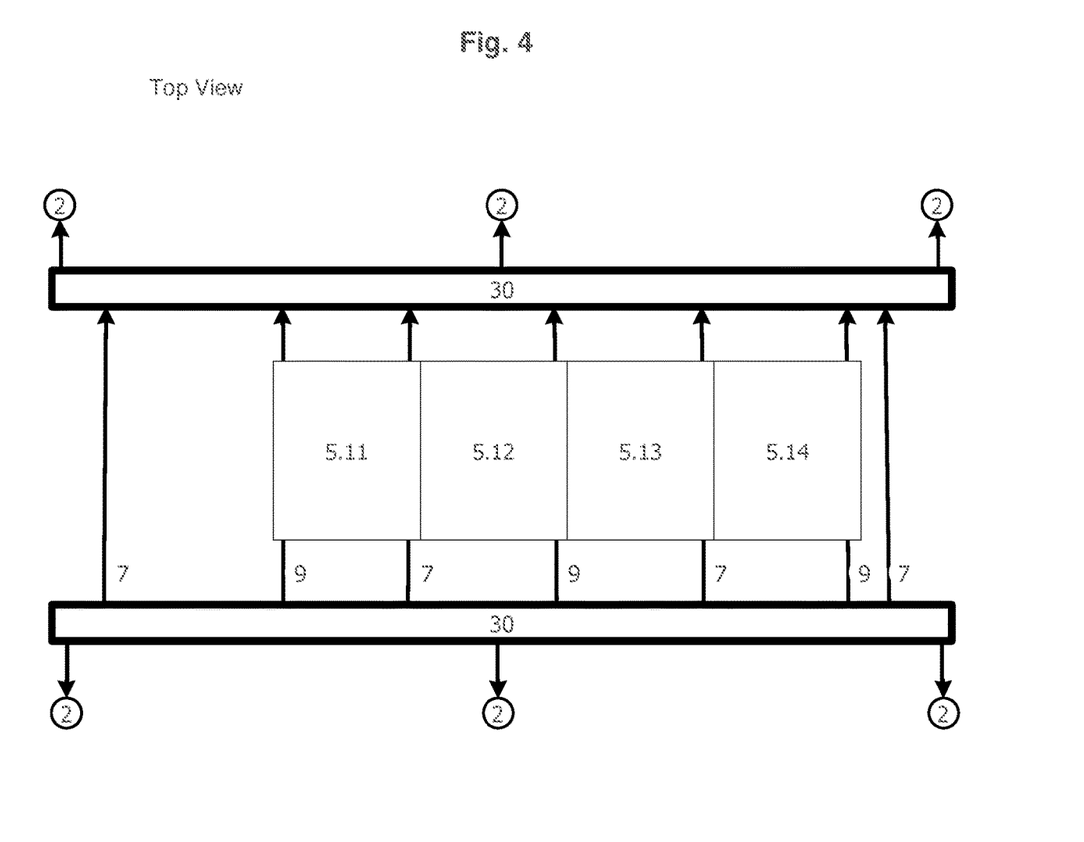
FIG. 4—is a top view of the cable support system for the solar system having solar panels.

Turning to FIG. 3, FIG. 3 is a side view depicting largely the cable structural elements. Cable structure support 10 is placed internal of the MFF (i.e., within the sealed operating zone of the solar panels) and is repeated along the horizontal dimension to provide structural support to the MFF. Each instance of cable structure 9 provides both structural support to the solar panels 5.11 through 5.14 AND importantly in the preferred embodiment the cable structure is also an electrical stringer for the solar panels (though not shown, cable structure 9 must have both positive and negative voltage capability, or in the preferred situation an offsetting cable structure 9 is a positive voltage on a first side of the solar panel and a negative voltage on a second side of the solar panel, such as shown in FIG. 4 where cable structure 7 is offset with cable structure 9). In this Figure, structural element is 7 is also in structural continuity with the solar panels and in thermal continuity with the solar panels via heat exchanger or thermal spreader 12. In the preferred embodiment, structural element 7 is a cable structure providing both electrical and thermal conductivity pathways and is a positive voltage pathway for the solar panels.

Turning to FIG. 4, FIG. 4 is a top view of the structural elements. As shown, though not to scale particularly in the length direction (i.e., between the top and bottom rigid structures 30), the solar panels (as shown 5.11 through 5.14) are in structural communications to cable structures 7 and 9. The method of implementation, as anticipated, is to provide post-tension cable from rigid structure 30 via flexible cable structure 2 ultimately serving as a rigid framework. The cable structures 7 and 9 are individually post-tensioned after the post-tensioning of cable structures 2 (which is ideally a cable structure roller enabling cable to be wound into and on the roller to shorten the cable length, while also controlling and maintaining the desired tensile force) to rigid structural elements 30. As known in the art of cable structures, it is understood that a rigid frame can be created in multiple design approaches ranging from a perimeter frame of rigid elements, an I beam approach in which a rigid body is approximately in the center of two perpendicular rigid bodies (one at each end of the length direction of solar array) direction), or virtually any arrangement of rigid bodies. But all the approaches enable a cable structure to be predominantly utilized for structural support of the solar panels. The further preferred rigid structural element enables the aggregation (including potential mounting of direct-current or alternating-current power conversion devices) of electrical flow (both the positive and negative voltage) in a power busbar type of implementation. Though not preferred it is understood that additional cable or rigid structures can be used to further stabilize the solar array structural framework in the width direction, and any structural elements along the width direction can also be in electrical communications indirectly to the solar panels via flexible cable structures 7 and 9. The particularly preferred cable support for the solar panels (or collectively an array of solar panels) is a bare electrically conductive wire. The term "bare" is indicative of an electrical wire operable to carry electrical current absent of a thick (greater than 500 microns, and preferably greater than 50 microns) polymeric encapsulant as traditionally utilized to limit electrical wire exposure to water (in all its forms as water, snow, or ice). The utilization of the bare wire, or electrical wire having a sufficiently thin coating (and if so, preferably the thin coating is burned off during the welding of solar panel electrical connection to the electrical wire serving as both cable support and stringer wire.

Figure 5:
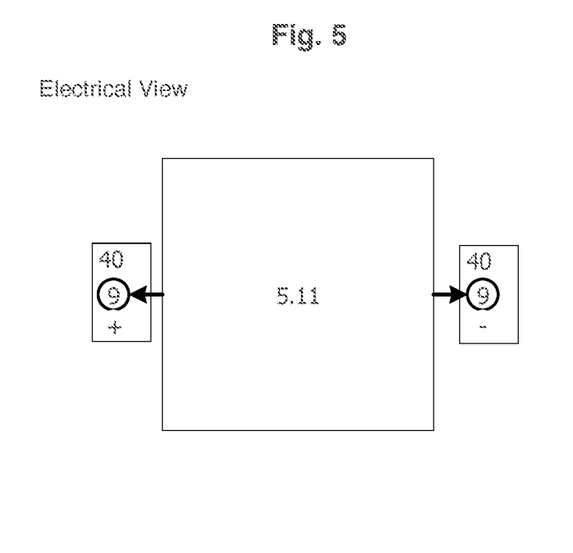
FIG. 5—is an electrical functionality view of the solar system having solar panels.

Turning to FIG. 5, FIG. 5 is a top view, though more importantly a functional view, of the solar panel 5.11 having one edge (preferably along the length direction) connected to cable support structure (as shown 9) with the left cable support structure being a positive voltage and the left cable support structure being a negative voltage (though also understood that the electrical circuit could be alternating current in the event that each solar panel or an array of solar panels is connected to a micro-inverter). As shown, which is optional, a sealant 40 is placed over the electrical connection between the solar panel 5.11 and the cable support structure (9 as shown).

Figure 6:
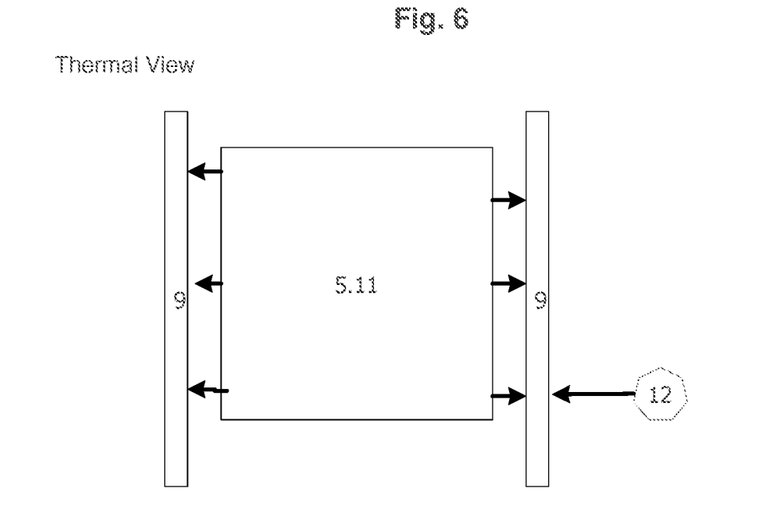
FIG. 6 is a thermal functionality view of the solar system having solar panels.

Turning to FIG. 6, FIG. 6 is a thermal pathway functional view in the preferred embodiment where the thermal spreader (not shown, as it would cover the majority of solar panel back) on the solar panel 5.11 has thermal continuity with the cable support structure (9 as shown) via direct edge connection or as known in the art through a thermal connector preferably having superior in-plane heat transfer. And the optimal embodiment also has thermal continuity with heat exchanger or thermal spreader 12.

Figure 8:
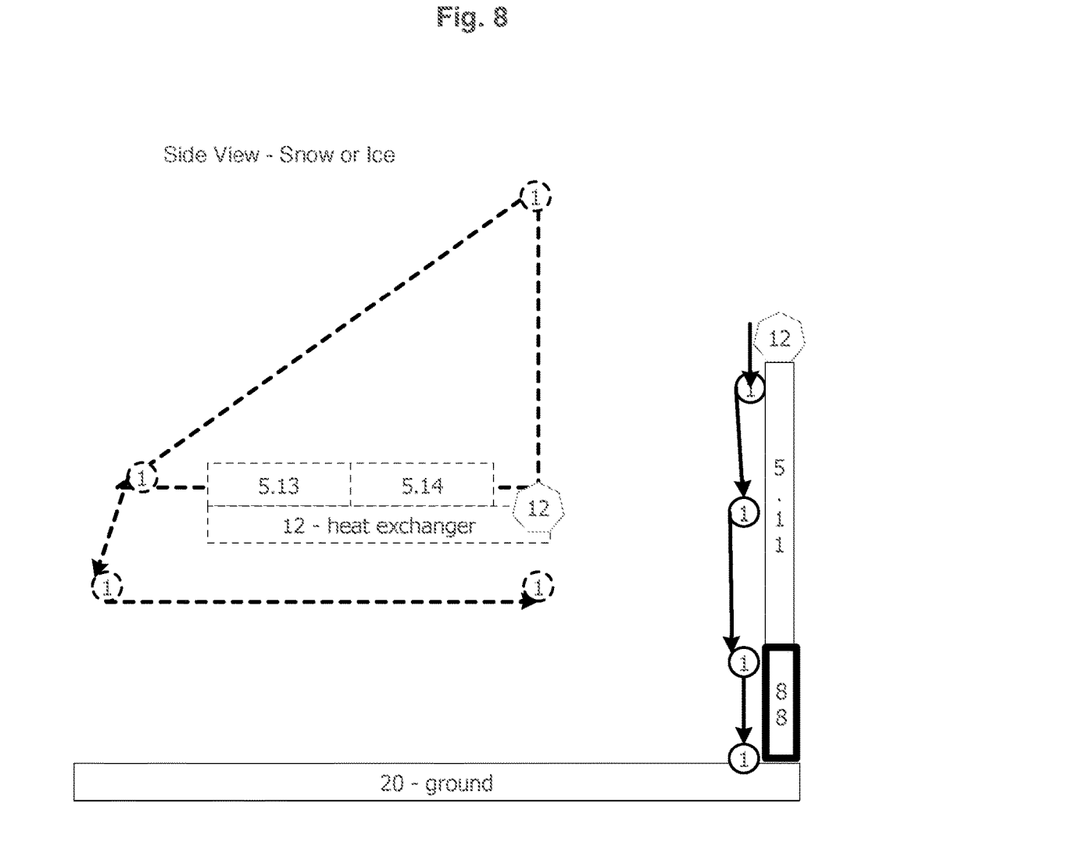
FIG. 8—is a side view of the solar system having solar panels in both the normal and reconfigured position when the system is or is expected to be experiencing high snow or ice loads.
Figure 9:
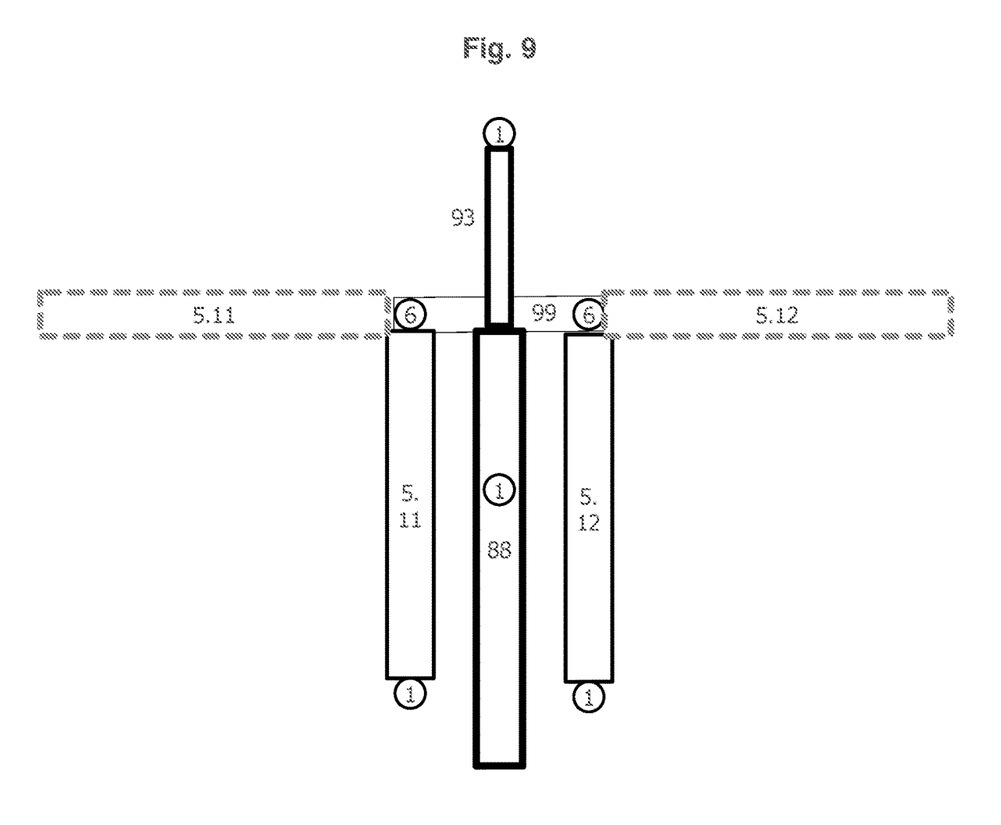
FIG. 9—is a side view of the solar system having solar panels in both the normal and reconfigured position on a single center mount highpoint when the system is or is expected to be experiencing high snow or ice loads.

Yet another embodiment, as shown in FIG. 9, is the ground support structure enabling the same external operating envelope isolation film MFF to cover the entire surface area below the MFF isolation film while still enabling a concurrent freedom of movement (by a container or vehicle not shown to travel) along the entire length of the solar system above the ground, as differentiated by FIG. 8 where only the left or right (i.e., not both left and right) portion is isolated by the MFF through the MFF being rolled towards the center ground mounted support column.

Due to all the above reasons cited above, the fundamental weight reduction of the structure and the solar panels, the inventive system reduces the embodied carbon footprint of solar systems by at least 50 percent (and preferably by at least 80 percent, and particularly preferred by at least 90 percent) for the same solar panel orientation with and without the isolation MFF.

The further ability to reduce the reconfigure between a reduced horizontal profile and a reduced vertical profile enables the system through the MFF to reduce surface area exposed to the external environment, which is isolated from the solar panels creating a distinct operating environment for the solar panels, leading to reduced impact respectively of snow & ice accretion, and wind.

Figure 7:
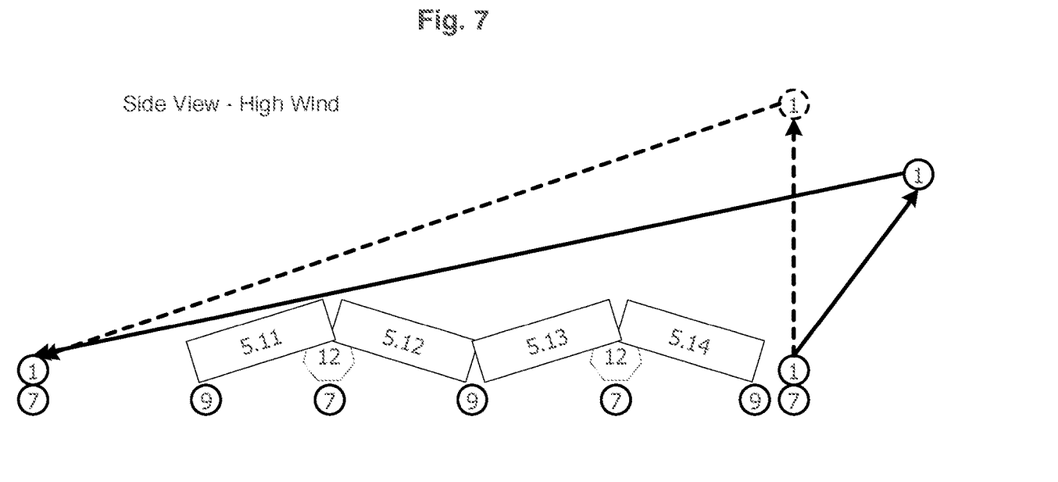
FIG. 7—is a side view of the solar system having solar panels in both the normal and reconfigured position when the system is or is expected to be experiencing high wind loads.

Turning to FIG. 7, FIG. 7 depicts a side view with two distinct configurations to reduce the aerodynamic profile during high wind conditions. The dashed lines (which represent the relative position of both the cable structure 10 (as shown in other figures) and the MFF (also as shown in other figures) are the approximate position during normal mode operations (i.e., negligible or at least not high wind speeds, meaning preferably when wind speeds are less than 30 miles per hour or preferably less than 20 miles per hour) and the solid lines are the approximate position during high wind conditions. It is understood that maximum height of the system is greater during normal operation, by at least 25 percent higher (and preferably at least 75 percent, and more preferred at least 90 percent) than the high wind speed mode, meaning the normal mode has a more vertical oriented MFF at its peak height and the high wind mode has a less vertical oriented MFF by at least 10 degrees (and preferably at least 20 degrees, and particularly preferred at least 30 degrees). The vertical dashed line, though not shown has the reflective surface between the two film rollers (both the top right 1 and the bottom right 1). Though not shown, an actuator or motor enables the movement of the at least top film roller 1 (upper right) to move positions from the first normal position to the second high wind position. Furthermore, the movement of the top film roller 1 can be either away from the solar panels (as shown) or towards the solar panels (not shown).

Turning to FIG. 8, FIG. 8 is another side view but in this instance for the condition of anticipated (or actual) snow or ice accretion. As stated elsewhere, the MFF has the lowest available ice adhesion strength such that the movement from the normal mode (as shown in the left solar system arrangement, with the dashed lines) to the high snow or ice mode (as shown in the right solar system arrangement, with the solid lines) enables predominantly gravity forces to remove any residual snow or ice. This is accomplished by reducing the horizontal surface area by at least 25 percent between the normal, and high snow or ice modes (and preferably by at least 50 percent, more preferred by at least 80 percent, and particularly preferred by at least 92 percent) in which at least the horizontal position of MFF rollers 1 relative to the final position of the solar panels (5.13 and 5.14 as shown in normal mode) is closer that to the final position of the solar panels (5.11 as shown in high snow or ice mode). Additionally, the remaining thermal continuity of heat exchanger or thermal spreader 12 to the solar panel 5.11 enables thermal energy to be transferred into the MFF to enhance the melting of any residual snow or ice from the MFF. As noted before, the heat transfer in-plane of the MFF minimizes the energy consumption (if any is required from external heating source, though not shown) in addition to the MFF continuing to prevent snow or ice adhesion to the solar panels due to the MFF always "encapsulating" the solar panels which is critical due to the otherwise ice-bridging conditions as known in the art. It is understood that MFF rollers 1 can be virtually any vertical position if the MFF has a reduced horizontal surface area exposure during snow or ice weather events. The above mentioned structure is in structural communication to a ground anchored structural element 88.

The utilization of cable structure combined with MFF empowered by weight reduced solar panels, due to external environmental isolation by the MFF, cascades into a system weight reduction leading to reconfigurable and collapsible solar (or greenhouse) system that is rapidly responsive to everchanging external environment conditions. The utilization of cable structure inherently enables flexing of the structural framework during the reconfigurable and collapsible modes.

Turning to FIG. 9, FIG. 9 depicts an alternative implementation of the system. This embodiment has a symmetrical deployment with the entire system raised above the ground (below 88, though not shown) by a vertically oriented structural element 88 providing ground mount, anchoring, and approximately central support to the solar panel array framework. As before, the dashed lines represent the normal mode while the solid lines represent the high snow or ice (or even high wind) mode, as the tributary forces applied on to the structural element 88 are reduced by at least 25 percent (and preferably above 75 percent, and particularly preferred above 92 percent). Likewise, the dead loads due to accreted snow and/or ice are reduced by at least the same percentages between the normal mode and high snow or ice mode. In this figure, the solar panel(s) represented as a singular panel 5.11 (on left side) and 5.12 (on right side) is in structural communication to the overarching solar rigid with cable framework with rotating structural elements 6 in structural communications to vertically oriented structural element 88 while at least one MFF roller 1 held above by top roller structural displacement element 93 remains above rotating structural element 6 so as to continue to provide isolation from the external weather conditions above MFF. In this embodiment there remains an area that is free from obstructions along the entire length of the system therefore enabling a container or logistics shuttle to always travel along the length and always remain sheltered from weather conditions. It is clear in this embodiment that the horizontal surface area is greatly diminished while in high snow or ice position, though the two rotating structural elements 6 are in structural communications with a short horizontal rigid element 99 that is then in turn in structural communication with the vertical oriented structural element 88. In this embodiment top roller structural displacement element 93 remains fixed. FIG. 9 having a center support element 88 that is ground mounted, which is fundamentally different than FIG. 8 embodiment having a side support element.

Figure 10:
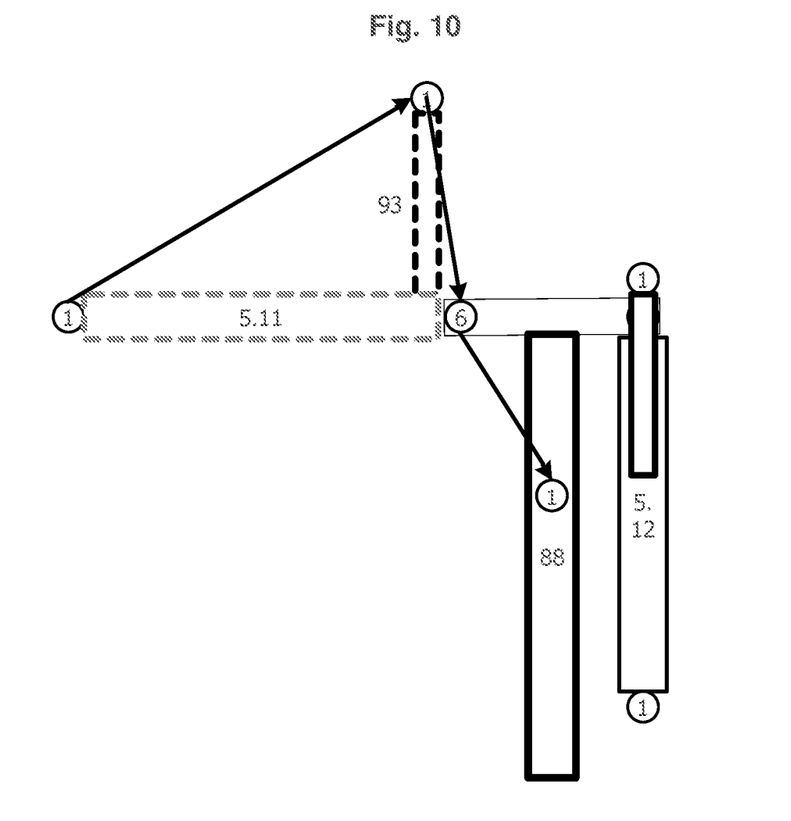
FIG. 10—is a side view of the solar system having solar panels in both the normal and reconfigured position on a single center mount highpoint for each left and right set of solar panels with the multifunctional film creating each left and right set of solar panels having a distinct environmental isolation when the system is or is expected to be experiencing high snow or ice loads.

Turning to FIG. 10, FIG. 10 is like FIG. 9 with the exception the MFF rolls down towards the vertically oriented structural element 88 towards rotating support element 6, which doesn't have the ability to isolate structural element 88 from snow or ice accumulation. It does have the advantage of a smaller horizontal surface area resulting from the stowed position of the MFF. In this embodiment top roller structural displacement element 93 is lowered when in the high snow or ice as well as the high wind mode to reduce the aerodynamic profile.

Figure 11:
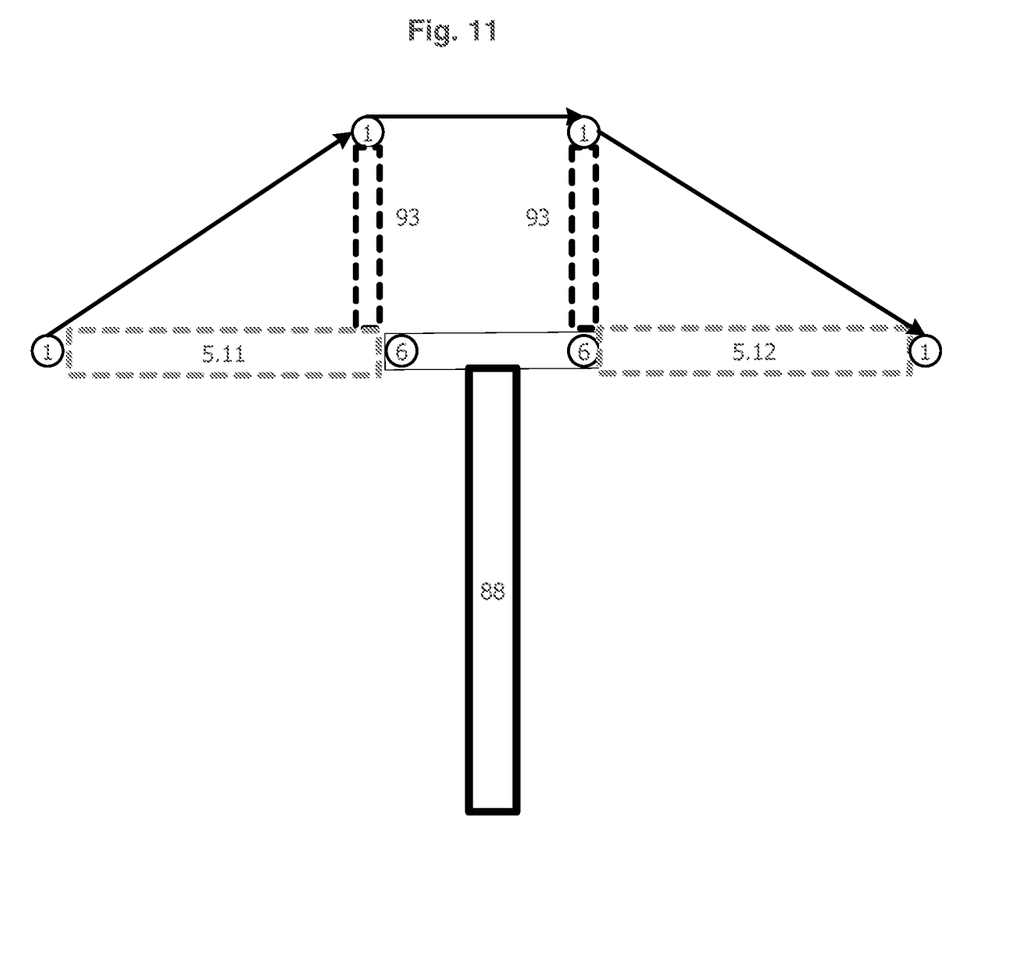
FIG. 11—is a side view of the solar system having solar panels in both the normal and reconfigured position on a dual mount highpoint for each left and right set of solar panels with the multifunctional film creating a singular environmental isolation for both the left and right set of solar panels when the system is or is expected to be experiencing high snow or ice loads.

Turning to FIG. 11, FIG. 11 is like FIG. 10 with the exception the MFF rolls down towards the vertically oriented structural element 88 towards rotating support element 6 but the rotating support element 6 may remain in the same relative position to the MFF rolls (1, the top ones) due to non-moving (though rotating with the solar panels 5.11, which doesn't have the ability to isolate the center support element 88 from snow or ice accumulation. It does have the advantage of a smaller horizontal surface area resulting from the stowed position of the MFF. In this embodiment top roller structural displacement element 93 is lowered when in the high snow or ice as well as the high wind mode to reduce the aerodynamic profile. Alternatively, the top roller structural displacement element 93 can be moved towards the center support element 88.

Figure 12:
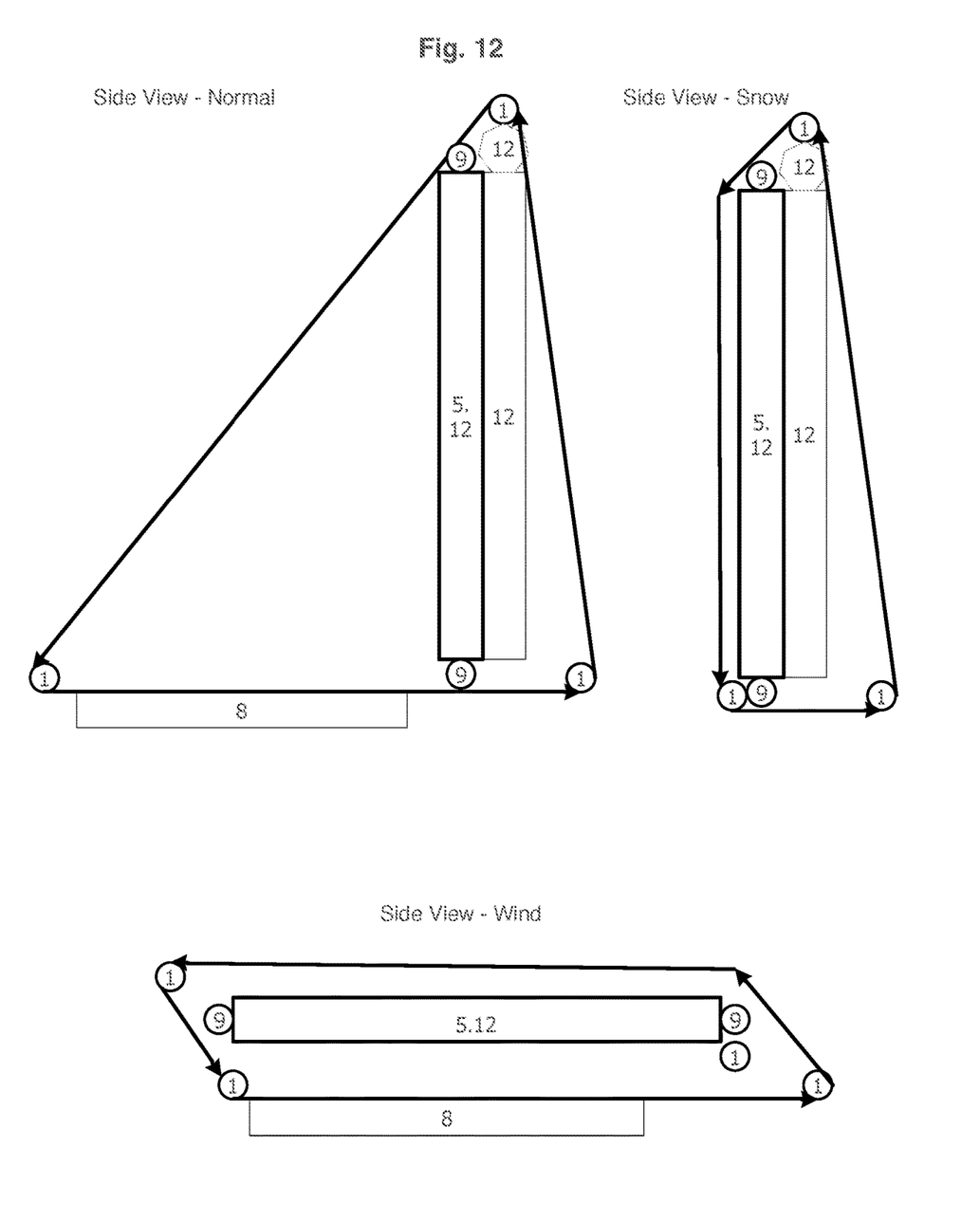
FIG. 12—is a series of side views of the solar system having solar panels in the normal and reconfigured positions for high snow and high wind conditions with the reflective film in a horizontal orientation and the solar panels in a vertical orientation.

Turning to FIG. 12, FIG. 12 is like FIG. 2 except that the vertical reflective portion on MFF 8 is swapped in terms of position with the horizontal solar panels 5.12. This embodiment maintains the weather isolation by the MFF (not numbered, but as shown by the vectors rolling over the MFF roller 1 and in structural communications to each of the MFF rollers 1 shown). This embodiment has the advantage of lower tributary loads relative to FIG. 2 embodiment, though the disadvantage of higher aerodynamic forces due the solar panel 5.12 being vertically oriented. FIG. 12 shows the system in its normal mode, high snow or ice mode, and the high wind mode. All embodiments maintain the inventive features in terms of thermal management, reduced horizontal surface area (particularly during critical high snow or ice conditions), and reduced vertical profile (particularly during critical high wind speed conditions). The high wind speed mode doesn't show the heat exchanger/thermal spreader 12 but it is understood to remain in this embodiment and maintain the same relative orientation and position to the other structural and functional elements (i.e., removed for clarity of the critical change from normal mode to high wind mode). Moving from the normal mode to the high snow or ice mode is done by displacement of the lower MFF roller 1 towards the bottom of the solar panel 5.12 as well as the MFF being "shortened" by rolling "into" at least one of the MFF roller 1 (and preferably the bottom right MFF roller 1). Moving from the normal mode to the high wind speed mode is similar except the entire solar panel 5.12 and its structurally communication elements rotate towards the horizon and any MFF slack is rolled into at least one of the MFF roller 1 (and preferably the bottom right MFF roller 1). The term "rolling into" is understood that the MFF is affixed into the roller such that rotation of the roller causes the MFF to be wound onto the roller, in this manner a desired tension of the MFF can be maintained during normal operations or dynamically changed to handle greater external forces or to increase shear forces between the MFF and any residual snow or ice to displace that residual snow or ice off of the MFF.

Figure 13:
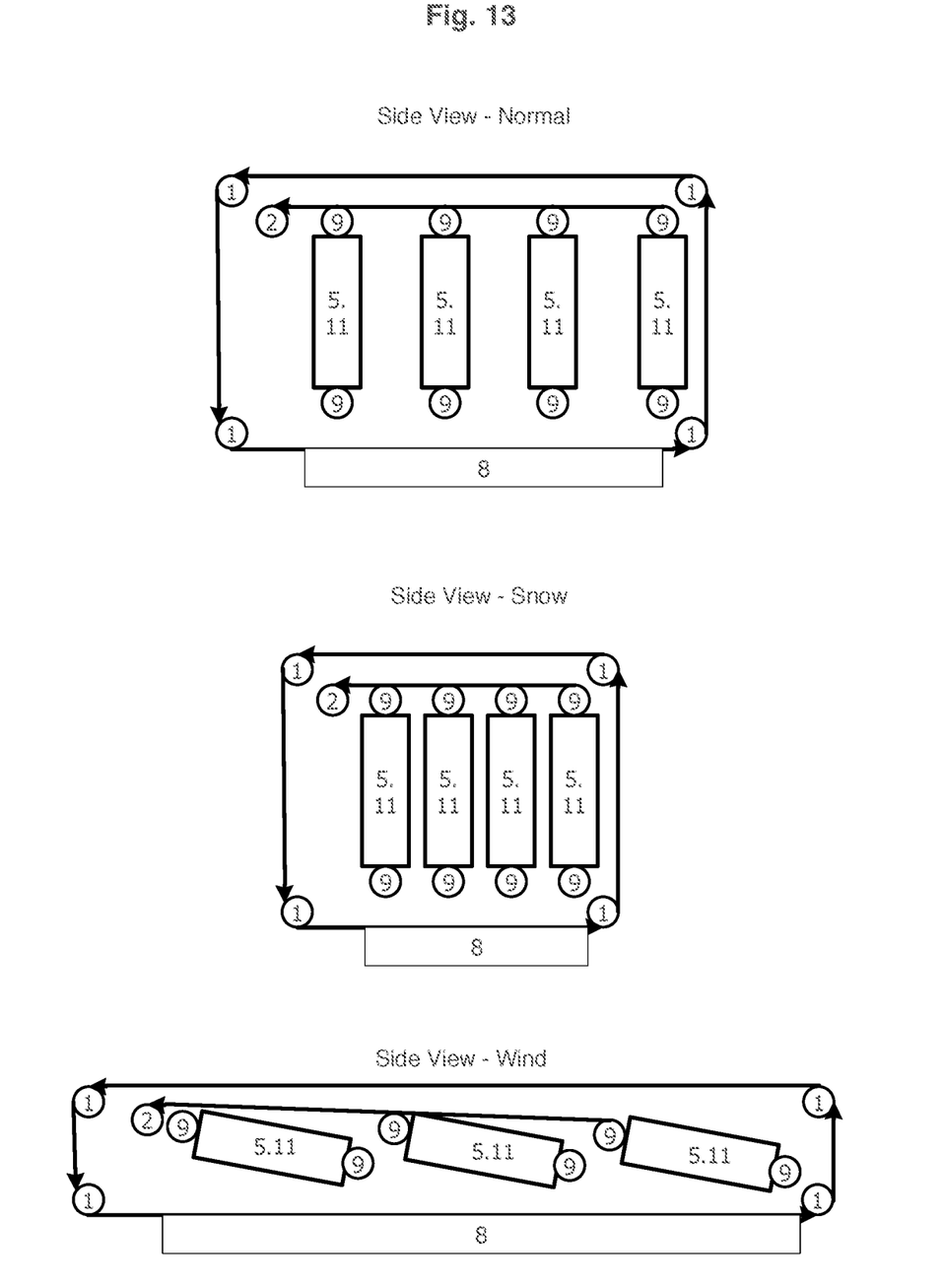
FIG. 13—is a series of side views of the solar system having solar panels in the normal and reconfigured & collapsible positions for high snow and high wind conditions with the reflective film in a horizontal orientation and the solar panels in a vertical orientation.

Turning to FIG. 13, FIG. 13 is another embodiment of the invention in which an array of solar panels 5.11 are approximately vertical during the normal operating mode. This embodiment enables through the cable structure 9 the solar panels 5.11 to rotate to effectively provide 1-axis tracking in addition to reconfiguration of the solar panels 5.11 into a partially overlapping horizontal position to reduce the aerodynamic profile while always remaining within an isolated operating zone due to the MFF enveloping the entire solar panel array. As shown the solar panel 5.11 is still in structural communication (and preferred also in electrical communication) to the cable structure 9. Though only shown in the top normal view, each of the at least top cable structures 9 are preferably in structural communication through another cable element (shown as vector into cable roller 2) such that a reduced set of actuators or motors is required and more importantly such that the movement of the top portion of each solar panel 5.11 is moved simultaneously in an identical manner. The particularly preferred utilization of the cable element (shown as vector into cable roller 2) also enables each of the solar panels 5.11 to become closer to each other on the horizontal direction by having that cable element as shown being the vector wound onto a cable roller 2 from cable structure 9. It is understood that the cable roller 2 position is changed by an actuator or motor in accordance with the designated position for normal mode, high snow or ice mode, and high wind mode. The cable roller 2 position for high snow or ice modem is shorter relative to the furthest away top cable structure 9. The cable roller 2 position for high wind mode is longer and lower to the furthest away top cable structure 9. It is a fundamental inventive feature in all of the embodiments to maintaining the cable, cable roller, and solar panels within the weather isolated environment by the MFF always encapsulating the overall solar panel array structure (and at worst utilizing the ground as the bottom isolating side).

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A reconfigurable cable support structure with external environmental isolation system consisting of:
    a. a multifunctional film supported by an at least one film cable structure to isolate an external weather environment above the multifunctional film from an interior isolated environment below the multifunctional film;
    b. an array of solar panels supported by an at least one solar panel cable structure and the array of solar panels is configured in a first position for a normal mode configuration and a second position for an alternative mode configuration;
    c. whereby the multifunctional film has a first position effective horizontal surface area and a first position effective vertical surface area when configured in the first position;
    d. whereby the multifunctional film has a second position effective horizontal surface area and a second position effective vertical surface area when configured in the second position;
    e. whereby of the second position effective horizontal surface area is lower than the first position effective horizontal surface area or the second position effective vertical surface area is lower than the first position effective vertical surface area;
    f. whereby the array of solar panels and the at least one solar panel cable structure are below the multifunctional film;
    g. whereby the array of solar panels is in thermal communications with the multifunctional film having an in-plane thermal transfer from the array of solar panels to the multifunctional film; and
    h. whereby the in-plane thermal transfer from the array of solar panels to the multifunctional film is at least ten percent higher than the array of solar panels in the normal mode configuration without the multifunctional film isolating the array of solar panels from the external weather environment.

2. The reconfigurable cable support structure with external environmental isolation system as claimed in claim 1 whereby the multifunctional film has an ice adhesion strength lower than 150 kPa.

3. The reconfigurable cable support structure with external environmental isolation system as claimed in claim 1 whereby the multifunctional film has a top weather facing flat profile and a bottom solar panel facing non-flat profile.

4. The reconfigurable cable support structure with external environmental isolation system as claimed in claim 2 whereby the multifunctional film has a top weather facing flat profile and a bottom solar panel facing non-flat profile.

5. The reconfigurable cable support structure with external environmental isolation system as claimed in claim 4 whereby the bottom solar panel facing non-flat profile optically redirects a solar vector having an entry film angle passing through the multifunctional film and having an exit film angle after passing through the multifunctional film that is at least ten degrees different between the entry film angle and the exit film angle.

6. The reconfigurable cable support structure with external environmental isolation system as claimed in claim 1 whereby the at least one solar panel cable structure is operational as both a support framework for the array of solar panels and an electrical stringer for the array of solar panels.

7. The reconfigurable cable support structure with external environmental isolation system as claimed in claim 1 whereby the at least one solar panel cable structure is a bare electrically conductive wire due to the multifunctional film isolating the array of solar panels and the at least one solar panel cable structure from the external weather environment.

8. The reconfigurable cable support structure with external environmental isolation system as claimed in claim 1 whereby the second position for the alternative mode configuration is an assembly position for the array of solar panels.

9. The reconfigurable cable support structure with external environmental isolation system as claimed in claim 1 whereby the second position for the alternative mode configuration is either or both a high wind position, or a high snow or ice position.

10. The reconfigurable cable support structure with external environmental isolation system as claimed in claim 1 whereby the multifunctional film has a total multifunctional film surface area and where the multifunctional film has an at least portion of the total multifunctional film surface area consisting of a solar reflective surface area and whereby the solar reflective surface area both redirects an incoming solar energy vector and enhances an in-plane heat transfer in the multifunctional film from a heat source that originates from the array of solar panels into the multifunctional film to reduce an amount of accreted snow or ice from the multifunctional film.

11. The reconfigurable cable support structure with external environmental isolation system as claimed in claim 1 whereby the at least one solar panel cable structure provides both a thermal pathway and an electrical pathway.

12. The reconfigurable cable support structure with external environmental isolation system as claimed in claim 1 whereby the at least one solar panel cable structure is a bare wire enabling assembly of the array of solar panels by an automated welding process for electrical communications between the bare wire and the array of solar panels.

13. The reconfigurable cable support structure with external environmental isolation system as claimed in claim 1 is further consisting of a roller in structural communications with the multifunctional film to reduce friction forces during movement from the first position to the second position and to measure as a sensor an amount of accreted snow or ice on the multifunctional film.

\* \* \* \* \*